United States Patent [19]

Naito

[11] Patent Number: 5,173,645
[45] Date of Patent: Dec. 22, 1992

[54] BRUSHLESS MOTOR DRIVE CIRCUIT

[75] Inventor: Hayato Naito, Komagane, Japan

[73] Assignee: Sankyo Seiki Mfg. Co., Ltd., Nagano, Japan

[21] Appl. No.: 547,798

[22] Filed: Jul. 3, 1990

[30] Foreign Application Priority Data

Jul. 3, 1989 [JP] Japan .................. 1-172547
Oct. 25, 1989 [JP] Japan .................. 1-278145

[51] Int. Cl.$^5$ .................. H02P 5/06; H02K 29/00
[52] U.S. Cl. .................. 318/138
[58] Field of Search .................. 318/138, 254, 439

[56] References Cited

U.S. PATENT DOCUMENTS

| | | | |
|---|---|---|---|
| 3,924,167 | 12/1975 | Clark et al. | 318/254 |
| 4,230,976 | 10/1980 | Muller | 318/254 |
| 4,442,386 | 4/1984 | Uchida et al. | 318/254 |
| 4,912,379 | 3/1990 | Matsuda et al. | 318/254 |
| 4,987,352 | 1/1991 | Ishii | 318/254 |

*Primary Examiner*—David Smith, Jr.
*Attorney, Agent, or Firm*—McAulay Fisher Nissen Goldberg & Kiel

[57] ABSTRACT

A brushless motor drive circuit having a position detection output signal in the form of an m-phase sine wave with a signal composing circuit to flatten the inflection points of the sine wave by logarithmic compression. Switching elements control the rate of the current to the drive coil in response to the signal composing circuit. Simultaneously, the switching elements having the same phase are switched on to supply a resistive feedback element with reactive current during the periods when no current is to be supplied to the drive coil.

8 Claims, 14 Drawing Sheets

BRUSHLESS MOTOR DRIVE CIRCUIT

BACKGROUND OF THE INVENTION

1. Field of the Invention

This invention relates to a brushless motor drive circuit.

2. Background Prior Art

Brushless motor drive circuits of so-called current drive type are widely known and popularly used. Since brushless motor drive circuits of the current drive type are accompanied by the problem of generation of torque ripples in the current level, a drive circuit as illustrated in FIG. 8 of the accompanying drawings has been proposed to reduce such torque ripples (Japanese Patent Laid Open Publication No. 61-42288).

FIG. 8 illustrates in block diagram form a prior art arrangement which is of a 3-phase 120° soft switching type comprising three position detecting means. FIGS. 2(I) and (II) illustrate respectively the waveform of a signal detected by the position detecting means and that of a signal processed by the signal processing means.

In FIG. 8 a brushless motor drive circuit comprises at least a stator (not shown), a rotor (not shown), Hall devices 11u, 11v and 11w which serve as position detecting means, signal processing means 20 comprising Hall amplifying circuits 16u, 16v and 16w and a signal composing circuit 12d, a group of positive side switching devices 13a, a group of negative side switching devices 13b, a current detecting resistor 14 that constitutes current detecting means and current control means 15.

These components are described below.

The stator of the prior art has m(=3 hereinafter)-phase drive coils Lu, Lv and Lw as illustrated in FIG. 1. The rotor, on the other hand, has magnetic poles (not shown). The Hall devices 11u, 11v and 11w generate and transmit signals Vu Vv and Vw in the form of 3-phase sine waves in accordance with the positional relationship between the stator and the rotor as illustrated in FIG. 2(I) and the output signals are respectively supplied to the Hall amplifying circuits 16u, 16v and 16w. The signals which are logarithmically compressed in the Hall amplifying circuits 16u, 16v and 16w are then supplied to the signal composing circuit 12. The signal processing means 20 comprising the Hall amplifying circuits 16u, 16v and 16w and the signal composing circuit 12 have the role of transforming the output signals Vu, Vv and Vw from the Hall devices 11u, 11v and 11w into rectangular wave pulse signals by flattening the inflection points so as to develop 3-phase soft switching signals from them as illustrated in FIG. 2(II) The output signal of signal composing circuit 12 is then supplied to signal circuits 17a and 17b. These signal circuits 17a and 17b provide respectively signals Sda and Sdb by appropriately adjusting the amplitude of the 3-phase soft switching signals in accordance with current error signal Sc. The signal Sda from the signal circuit 17a is supplied to the positive side group of switching devices 13a, whereas the signal Sdb from the signal circuit 17b is transmitted to the negative side group of switching devices 13b. The positive side group of switching devices 13a switches the current supplied to the 3-phase drive coils Lu, Lv and Lw in accordance with the signal Sda transmitted from the signal composing circuit 12 by way of the signal circuit 17a. On the other hand, the negative side group of switching devices 13b switch the current supplied to the 3-phase drive coils Lu, Lv and Lw in accordance with the signal Sdb transmitted from the signal composing circuit 12 by way of the signal circuit 17b. The positive side group of switching devices 13a of this prior art comprises transistors $Q_{31}$ through $Q_{33}$. The negative side group of switching devices 13b, on the other hand, comprises transistors $Q_{34}$ through $Q_{36}$.

The current detecting resistor 14 can detect currents flowing through the drive coils Lu, Lv and Lw. The current control means 15 is designed so as to be capable of controlling the level of the currents being supplied to the drive coils Lu, Lv and Lw from the positive and negative side groups of switching devices 13a and 13b and typically comprises a current feedback amplifier.

A brushless motor drive circuit having a configuration as described above operates in the following manner.

The Hall devices 11u, 11v and 11w generate respectively output signals Vu, Vv and Vw in the form of a 3-phase sine wave as illustrated in FIG. 2(I) in response to the positional relationship between the stator and the rotor. The output signals Vu, Vv and Vw from the Hall devices 11u, 11v and 11w are then transmitted to the Hall amplifying circuits 16u, 16v and 16w. The signals coming from the Hall amplifying circuits 16u, 16v and 16w are supplied to the signal composing circuit 12, where the output signals Vu, Vv and Vw of the Hall devices are transformed into rectangular pulse signals as the inflection points are flattened by means of logarithmic compression and 3-phase soft switching signals ($V_u'$, $V_v'$ and $V_w'$), as illustrated in FIG. 2(II), are developed from them. The composed 3-phase soft switching signals are then used to produce a positive side signal Sda since as their amplitudes are independently modified in accordance with the current error signal Sc in the signal circuit 17a. Similarly, they are used to produce a negative side signal Sdb since their amplitudes are independently modified in accordance with the current error signal Sc in the signal circuit 17b. The positive side signal Sda from the signal circuit 17a and the negative side signal Sdb from the signal circuit 17b are then supplied respectively to the positive side group of switching devices 13a and the negative side group of switching devices 13b for switching the current supplied to the 3-phase drive coils Lu, Lv and Lw. The currents flowing through the drive coils Lu, Lv and Lw are detected by the current detecting resistor 14.

Current control means 15 compares the detection signal from the current detecting resistor 14 and a predetermined reference level $V_{CTL}$ of the currents to be supplied to the drive coils Lu, Lv and Lw and forms a current error signal Sc for controlling the level of the currents supplied to the drive coils Lu, Lv and Lw. The current error signal Sc is supplied to the signal circuits 17a and 17b.

FIG. 4, illustrates the waveform of the current $\alpha I'u$ and that of $\alpha Iu$ having phase U indicated in FIG. 8. (Note that the currents with phases V and W have a waveform similar to the one illustrated but their phases are shifted by 120° and 240° respectively.) As seen from the waveform of FIG. 4, there exist timings when no currents are supplied for a predetermined period of time or when a portion of the circuit becomes open (as indicated by $t_0$ in FIG. 4). The existence of timings for providing openness of a portion of the circuit can also be verified for phase V and phase W. Since the supply of current to the 3-phase drive coils Lu, Lv and Lw is sequentially switched in accordance with the output signals of the Hall devices 11u, 11v and 11w, which serrve as rotor angular position detecting means, the rotor is forced to rotate.

Meanwhile, the currents that pass through the 3-phase drive coils Lu, Lv and Lw are collected in the current detecting resistor 14 and converted to voltage $E_1$. The voltage $E_1$ is then used as a current detection signal which is supplied to the current control means 15. The current control means 15 compares voltage $E_1$ and a reference current level $V_{CTL}$ and controls the variable current source circuit $I_{CTL}$ so that the voltage $E_1$ is always kept equal to the reference current level $V_{CTL}$. As long as the reference current level $V_{CTL}$ is unchanged, the voltage $E_1$ generated by the current detecting resistor 14 is maintained to be constant so that constant currents are supplied to the drive coils Lu, Lv and Lw for driving the brushless motor.

If it is assumed that the 3-phase counter electromotive voltages generated in the drive coils Lu, Lv and Lw have a sine waveform, the torques Tu, Tv and Tw generated in the phases are respectively expressed by formulas shown below.

$$Tu \propto (a\Gamma u - aIu)\sin(\theta - 30°)$$

$$Tv \propto (a\Gamma u - aIv)\sin(\theta - 90°)$$

$$Tw \propto (a\Gamma u - aIw)\sin(\theta - 210°)$$

Thus, composite torque T is expressed by $$T = Tu + Tv + Tw$$

FIG. 4 shows the composite torque T, which entails torque ripples of approximately 14.3%. The voltages $V_u'$, $V_v'$ and $V_w'$ produced by the signal composing circuit 12 are expressed respectively by the formulas (4) through (6) and the amplitudes of the voltages $V_u'$, $V_v'$ and $V_w'$ are equal to 400 m volts, p—p.

A motor of the current drive type is inevitably accompanied by the problem of torque ripples that take place with a frequency equal to the least common multiple of the number of poles of the stator drive coil and that of the rotor magnet at a level which is approximately 14% of the overall torque.

In order to overcome the problem of torque ripple, previously an additional torque ripple reduction circuit was required. Brushless motor drive circuits that can reduce the level of torque ripples are also disclosed in Japanese Patent Publication No. 56-34551 and Japanese Patent Disclosure Nos. 58-192490, 59-35585 and 59-76192.

While brushless motor drive circuits such as described above are realized in the form of integrated circuits (ICs), additional torque ripple reduction circuitry can increase the number of elements of the ICs and consequently make them complicated and large.

Besides, since any known brushless motor drive circuits utilize the waveforms of output signals of a Hall device which are used as means for detecting the angular position of the rotor to form torque ripple reduction signals, the effect of reduction of torque ripples can be adversely affected by uneven waveforms of the output signals of the Hall device, any distortion of the device and its temperature-related characteristics. In short, the torque ripple reduction effect of such circuits is dependent on the precision with which the Hall devices they comprise are made.

It is therefore the object of the present invention to provide a brushless motor drive circuit that does not require any complicated circuit configuration and is not affected by the composition of the torque ripple detecting means it comprises in forming torque ripple reduction signals.

In accordance with the invention, a brushless motor drive circuit comprises a stator having m-phase drive coils, a rotor having a number of magnetic poles, a plurality of angular position detecting means for providing output signals in the form of m-phase sine waves representing the positional relationship between the stator and rotor, signal processing means for transforming the output signal from each position detecting means into a rectangular wave pulse signal by flattening the inflection points of the sine wave by means of logarithmic compression so as to compose m-phase soft switching signals, a group of switching devices arranged in positive and negative sides for switching the current supplied to the m-phase drive coils in response to the output signal from the signal processing means, current control means for controlling the level of the current supplied to the m-phase drive coils by means of the positive and negative sides switching device and current detecting means arranged to detect the level of the current flowing through the drive coils and, by the use of negative feedback, applying the detecting current level to the current control means, reactive current being supplied to the current detecting means for reduction of torque ripple.

Also in accordance with the invention, a brushless motor drive circuit comprises a stator having an m-phase drive coil, a rotor for being rotationally driven by the stator, position detecting means for providing an output signal in the form of an m-phase sine wave representing the positional relationship between the rotor and stator, a signal composing circuit for transforming the output signal into a rectangular pulse signal by flattening the inflection points of the sine wave by means of logarithmic compression, a plurality of switching elements for switching the electric current supplied to the m-phase drive coil in response to the output signal of the signal composing circuit, the switching elements having an ON and OFF condition, current control means for controlling the rate of the current supplied to the m-phase drive coil by the plurality of switching elements, resistive means for detecting electric current flowing through the drive coil and for providing a negative feedback signal to the current control means, simultaneous ON-section generating means for simultaneously causing those switching elements having the same phase to be in an ON condition in order to supply the resistive means with the reactive current during the periods of current supply when no current is to be supplied to the m-phase drive coil and reactive current braking means for braking reactive current during the periods of electric current when current is to be supplied to the m-phase drive coil.

For a better understanding of the present invention, reference is made to the following description and accompanying drawings while the scope of the invention will be pointed out in the appended claims.

BRIEF DESCRIPTION OF THE DRAWINGS

FIGS. 11A and 11B are a graphic representation of waveforms of signals of the second embodiment.

DESCRIPTION OF THE PREFERRED EMBODIMENTS

In the following description, the term "positive side" signifies the side of a drive circuit where electric currents flow into drive coils, whereas the term "negative side" refers to the side of the circuit where electric currents flow out of drive coils.

Figure 5:
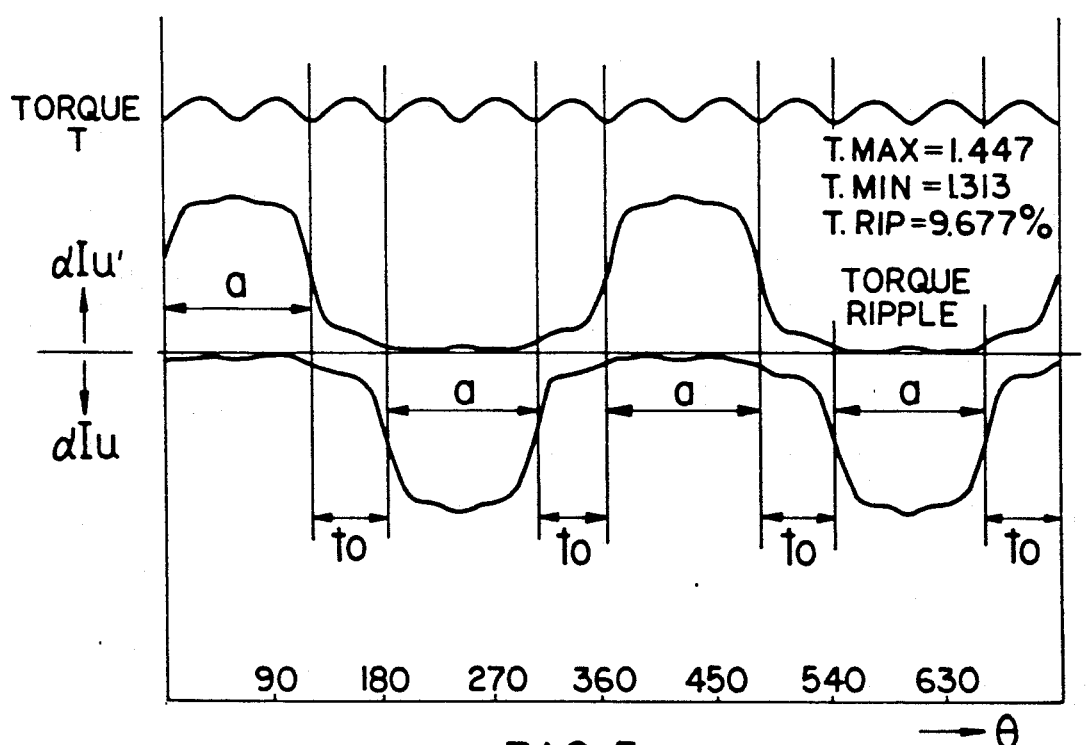
FIGS. 5 and 6 are graphic representations of the waveforms of signals of the first embodiment and its characteristics.
Figure 6:
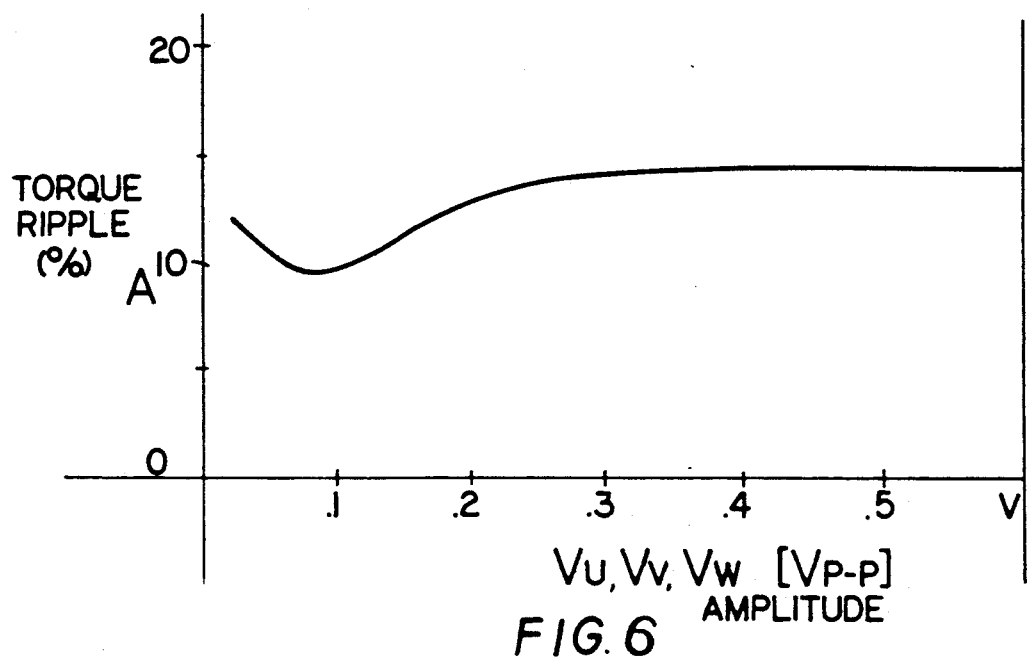

The present invention will now be described by referring to the circuit diagram of the embodiment illustrated in FIG. 1. FIGS. 5 through 6 are graphic representations of the waveforms of signals of this embodiment.

Figure 1A:
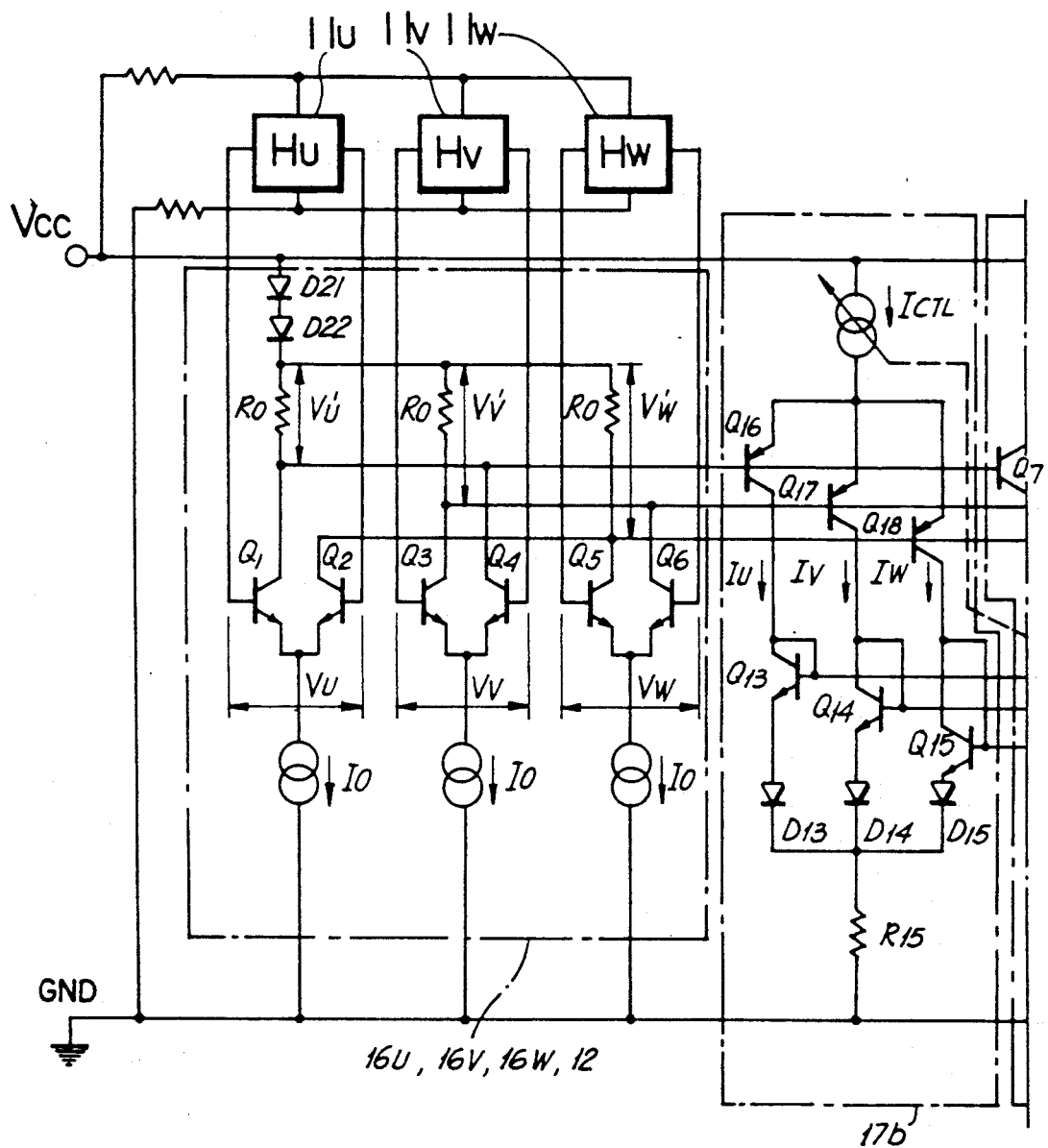
FIGS. 1A and 1B are a schematic diagram of a first embodiment of the invention.
Figure 1B:
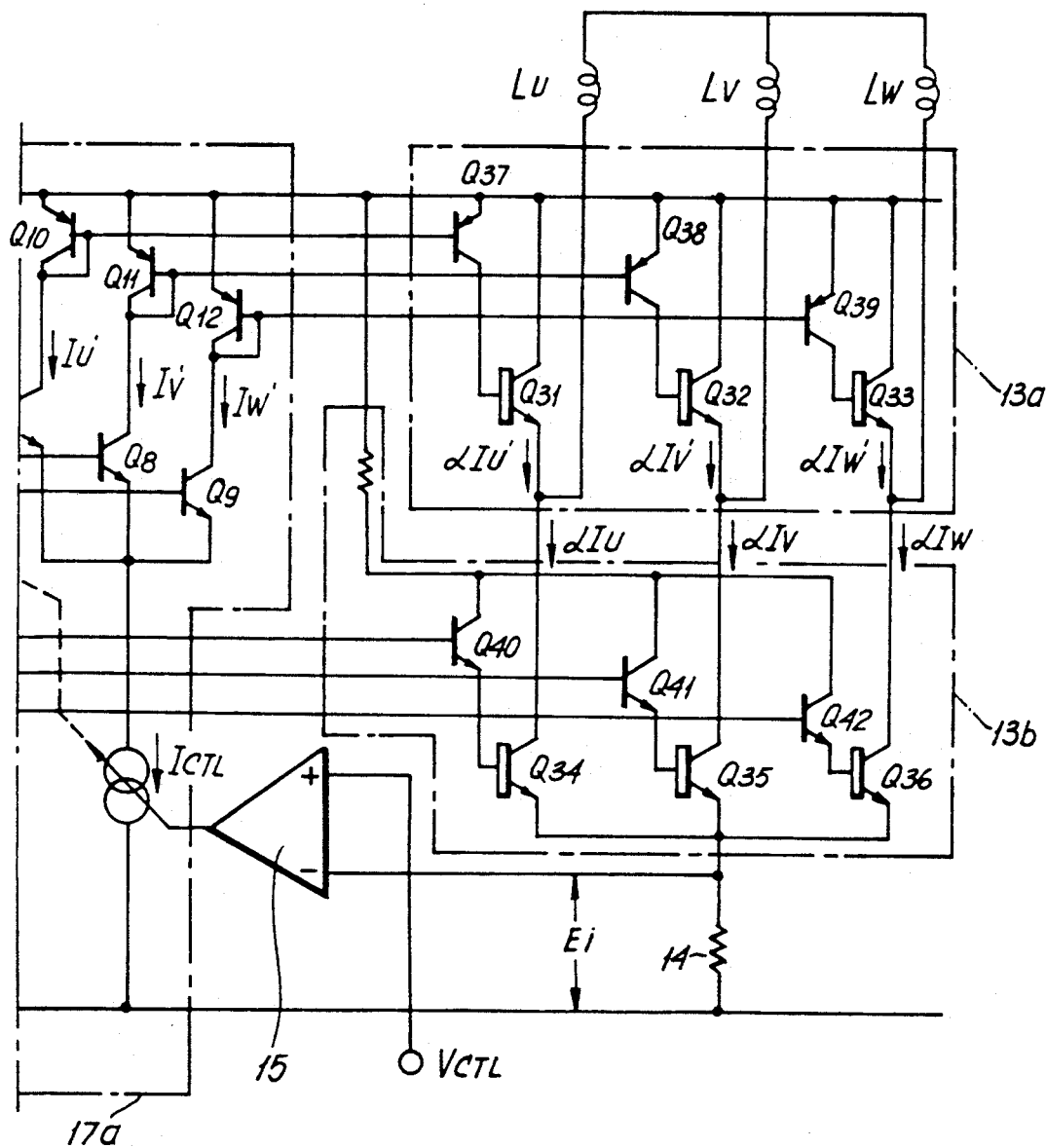

In FIG. 1 the Hall amplifying circuits $16u$, $16v$ and $16w$ comprise a signal composing circuit 12, transistors $Q_1$ through $Q_6$, a current source circuit Io, a resistor Ro and diodes $D_{21}$ and $D_{22}$. The signal circuit 17a comprises transistors $Q_7$ through $Q_{12}$ and a variable current source circuit $I_{CTL}$. The signal circuit 17b comprises transistors $Q_{13}$ through $Q_{18}$, a variable current source circuit $I_{CTL}$, diodes $D_{13}$ through $D_{15}$ and a resistor $R_{15}$. The positive side group of switching devices 13A comprise transistors $Q_{31}$ through $Q_{33}$ and transistors $Q_{37}$ through $Q_{39}$ which are connected to form a Darlington circuit, whereas the negative side group of switching devices 13B comprise transistors $Q_{34}$ through $Q_{36}$ and transistors $Q_{40}$ through $Q_{42}$ which are also connected to form a Darlington circuit.

If it is assumed that the Hall devices $11u$, $11v$ and $11w$ transmit signals in the form of sine waves having phases which are shifted by 120° from one another as illustrated in FIG. 2(I) and that the Hall devices $11u$, $11v$ and $11w$ respectively transmit signals Vu, Vv and Vw, then the following relationships apply:

$$Vu = 0.2 \sin\theta \quad (1),$$

$$Vv = 0.2 \sin(\theta - 120°) \quad (2)$$

$$Vw = 0.2 \sin(\theta - 240°) \quad (3),$$

which are respectively supplied to the 3-phase Hall amplifiers $16u$, $16v$ and $16w$ comprising transistor $Q_1$ through $Q_6$.

The signal composing circuit 12 composes a collector current for the transistors $Q_1$ and $Q_4$, one for the transistors $Q_2$ and $Q_5$ and one for the transistors $Q_3$ and $Q_6$ and the resistors Ro converts them into so many voltages.

Figure 2:
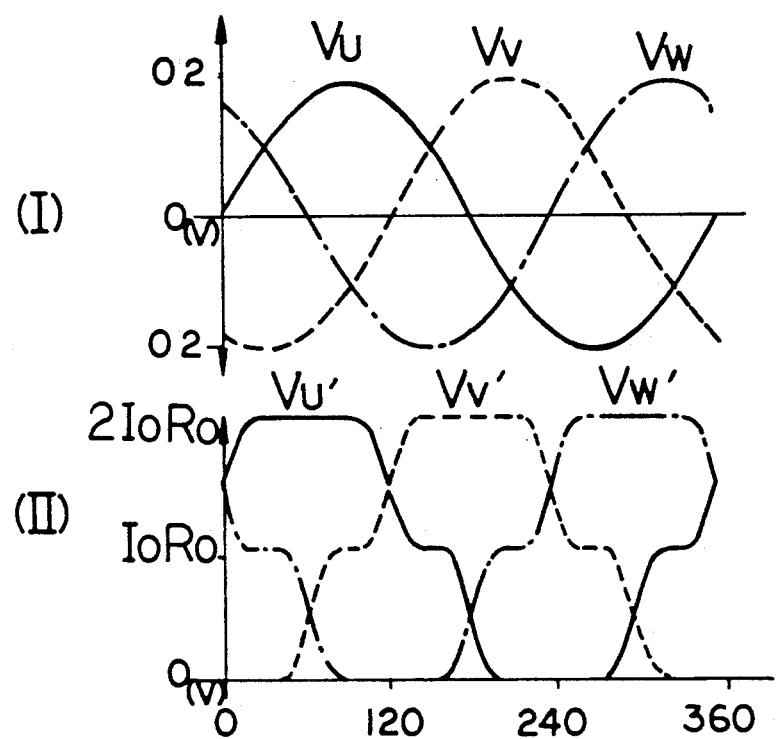
FIG. 2(I) and (II) are graphic representations of the waveforms of signals of the embodiment.

The waveforms of the voltages are shown in FIG. 2(II) and their values $V_u'$, $V_v'$ and $V_w'$ are expressed by equations (4) through (6) below.

$$V_u = \frac{2Io \cdot Ro}{1 + e^{\frac{q}{KT}(-Vu)}} - \frac{2Io \cdot Ro}{1 + e^{\frac{q}{KT}(-Vv)}} \quad (4)$$

$$V_v = \frac{2Io \cdot Ro}{1 + e^{\frac{q}{KT}(-Vv)}} - \frac{2Io \cdot Ro}{1 + e^{\frac{q}{KT}(-Vw)}} \quad (5)$$

$$V_w = \frac{2Io \cdot Ro}{1 + e^{\frac{q}{KT}(-Vw)}} - \frac{2Io \cdot Ro}{1 + e^{\frac{q}{KT}(-Vu)}} \quad (6)$$

where (as well as in any of the equations shown hereinafter):

e represents the base of natural logarithm,

K represents Boltzmann constant [J/°K.],

T represents the absolute temperature [°K.] and q represents the electric charge of an electron [C].

The voltages $V_u'$, $V_v'$ and $V_w'$ are applied to a differential amplifying circuit comprising the NPN transistors $Q_7$ through $Q_9$ contained in the signal circuit 17a and a differential amplifying circuit comprising the PNP transistors $Q_{16}$ through $Q_{18}$ contained in the signal circuit 17b. The signal circuit 17a supplied electric currents $I_u'$, $I_v'$ and $I_w'$ which are proportional to the output of the variable current source circuit $I_{CTL}$ respectively from the collectors of the transistors $Q_7$ through $Q_9$, whereas the signal circuit 17b supplies electric currents Iu, Iv and Iw which are also proportional to the output of the variable current source circuit $I_{CTL}$ respectively from the collectors of the transistors $Q_{16}$ through $Q_{18}$. The currents Iu, Iv and Iw which are proportional to the output of the variable current source circuit $I_{CTL}$ are respectively expressed by equations (7) through (9) below, whereas the currents Iu', Iv' and Iw' are respectively expressed by equations (10) through (12), further set further below.

$$Iu = \frac{I_{CTL}}{1 + e^{\frac{q}{KT}(Vv-Vu)} + e^{\frac{q}{KT}(Vw-Vu)}} \quad (7)$$

$$Iv = \frac{I_{CTL}}{1 + e^{\frac{q}{KT}(Vw-Vv)} + e^{\frac{q}{KT}(Vu-Vv)}} \quad (8)$$

$$Iw = \frac{I_{CTL}}{1 + e^{\frac{q}{KT}(Vu-Vw)} + e^{\frac{q}{KT}(Vv-Vw)}} \quad (9)$$

$$I'u = \frac{I_{CTL}}{1 + e^{\frac{q}{KT}(Vu-Vv)} + e^{\frac{q}{KT}(Vu-Vw)}} \quad (10)$$

$$I'v = \frac{I_{CTL}}{1 + e^{\frac{q}{KT}(Vv-Vw)} + e^{\frac{q}{KT}(Vv-Vu)}} \quad (11)$$

$$I'w = \frac{I_{CTL}}{1 + e^{\frac{q}{KT}(Vw-Vu)} + e^{\frac{q}{KT}(Vw-Vv)}} \quad (12)$$

The currents I'u, I'v and I'w are introduced to the positive side group of switching devices 13a comprising transistors $Q_{31}$ through $Q_{33}$ and $Q_{37}$ through $Q_{39}$ and having current amplification factor α so that currents αI'u, αI'v and αI'w obtained by respectively multiplying the original currents by α are respectively supplied to the 3-phase drive coils Lu, Lv and Lw as source currents.

Similarly, the currents Iu, Iv and Iw are supplied to the negative side group of switching devices 13b comprising transistors Q34 through Q36 and Q40 through Q42 and having current amplification factor α so that currents αIu, αIv and αIw obtained by respectively multiplying the original currents by α are respectively supplied to the 3-phase drive coils Lu, Lv and Lw as sink currents.

The amplitude of the voltages $V_u'$, $V_v'$ and $V_w'$ the equations are made equal to 100 m volts p—p by modifying either the resistor Ro of the signal composing circuit 12 or the output level of the current source circuit Io. The drive circuit operates in the following manner.

When the amplitude of the voltages Vu, Vv and Vw of the signal composing circuit 12 is equal to 100 m volts p—p, the waveform of the currents I'r, I'v and I'w from the signal circuit 17a and that of the currents Iu, Iv and Iw from the signal circuit 17b are further flattened. Consequently, the waveforms of the source currents supplied by the positive side group of switching devices 13a and those of the sink currents αIu, αIv and αIw applied by the negative side group of switching devices 13b are also modified. Of the waveforms of the source currents αI'u, αI'v and αI'w and those of the sink currents αIu, αIv and αIw, those that are related with phase U are shown in FIG. 5. As seen from FIG. 5, there exists a timing range t₀ when both source current αI'u and sink current αIu are brought forth. The relationship αI'u=αIu holds true at and near the middle point of the timing range t₀, when any significant portion of the current with phase U does not flow into the drive coil Lu and the current mostly flows from the power source Vcc into the current detecting resistor 14 by way of the transistors Q31 and Q34. This means that a relatively large reactive current that does not contribute to generation of torque is being generated. If the current feedback system is operational to maintain the current at a constant level, the current flowing through the current detecting resistor 14 is constant and therefore the overall torque of the motor is reduced by an amount that corresponds to the reactive current. The above described phenomenon occurs also for both phases V and W for every 60° and, as seen in FIG. 5, the cycle of occurrence of the phenomenon is synchronized with the cycle at which peaks of the composite torque appear. Therefore, the reduction of torque due to the reactive current satisfactorily suppress as the peaks of the composite torque, giving rise to a net reduction of torque ripples. The level of torque ripples of the above embodiment is reduced to approximately 9.7% or a reduction of 32% as compared with that of a conventional drive circuit.

FIG. 6 illustrates some of the characteristics of the embodiment, showing the relationship between the amplitude (m volts p—p) of the voltages $V_u'$, $V_v'$ and $V_w'$ expressed by the equations (4) through (6) and the level of torque ripple (expressed in terms of %).

The level of torque ripples (%) is varied as shown in FIG. 6 by varing the amplitude (m volts p—p) of the voltages $V_u'$, $V_v'$ and $V_w'$ expressed by the equations (4) through (6) through modification of the value of either the resistor Ro of the signal composing circuit 12 or the current source Io. If the amplitude is varied from 20 m volts p—p to 600 m volts p—p as seen in FIG. 6, the level of torque ripples shows an improvement at or lower than 300 m volts p—p and reaches its lowest point at or around 80 m volts p—p, turning upward beyond that point. Therefore, if the amplitude of the voltages $V_u'$, $V_v'$ and $V_w'$ and Vw of the equations (4) through (6) is modified to approximately 80 m volts p—p by varying the value of either the resistor Ro of the signal composing circuit 12 or the current source circuit Io, the level of torque ripples will show a significant improvement.

Variation of the value of resistor $R_o$ or the current source Io so as to modify the amplitude of Vu', Vv' and Vw' to about 80 m volts p—p are the means for causing reactive current to be supplied to the current detectiong means (resistor 14) for reduction of torque ripple. This is done by simultaneously causing the positive and negative sides switching devices to be capable of being supplied with current at a timing at which no current is supplied to the m phases as has been explained regarding FIG. 5.

As is apparent from the above description, the above embodiment does not require any additional circuitry for improvement of the torque ripple level, which is achieved simply by modifying the value of either the resistor Ro of the signal composing circuit 12 or the current source circuit Io. Moreover, since the Hall devices 11u, 11v and 11w respectively utilize the Hall amplifying circuits 16u, 16v and 16w in saturatd areas, they are not affected by the torque ripple improvement system of the embodiment and hence by the manufacturing of the Hall devices nor by the accuracy level of the outputs of those devices.

Since the embodiment does not require any additional circuitry for improvement of the level of torque ripples, it is free from any increase in dimensions for accommodating such additional circuitry and hence any additional manufacturing cost. Moreover, since the Hall devices of the embodiment are not used for generation of signals required for improvement of the torque ripple level, the current feedback system of the embodiment is not affected by such requirements and therefore the overall circuit can maintain its stability. A predriver may be provided upstream of the group of switching devices 13a and 13b when a large brushless motor is involved.

Figure 7:
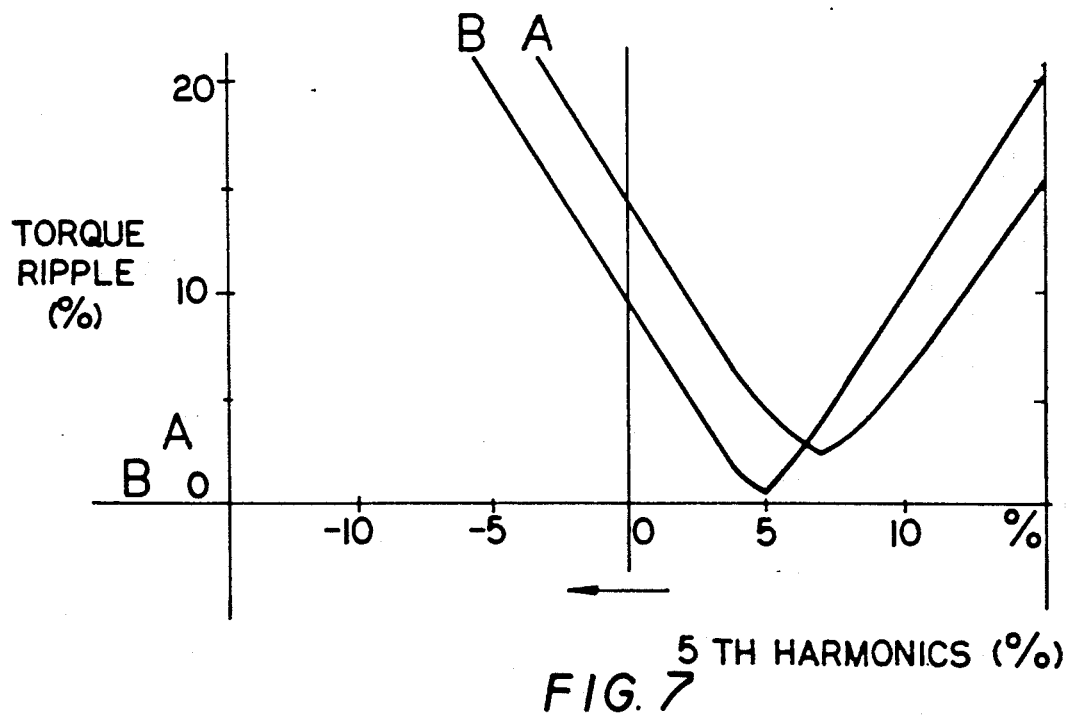
FIG. 7 is a graphic illustration of some of the characteristics of another embodiment of the invention.
Figure 8:
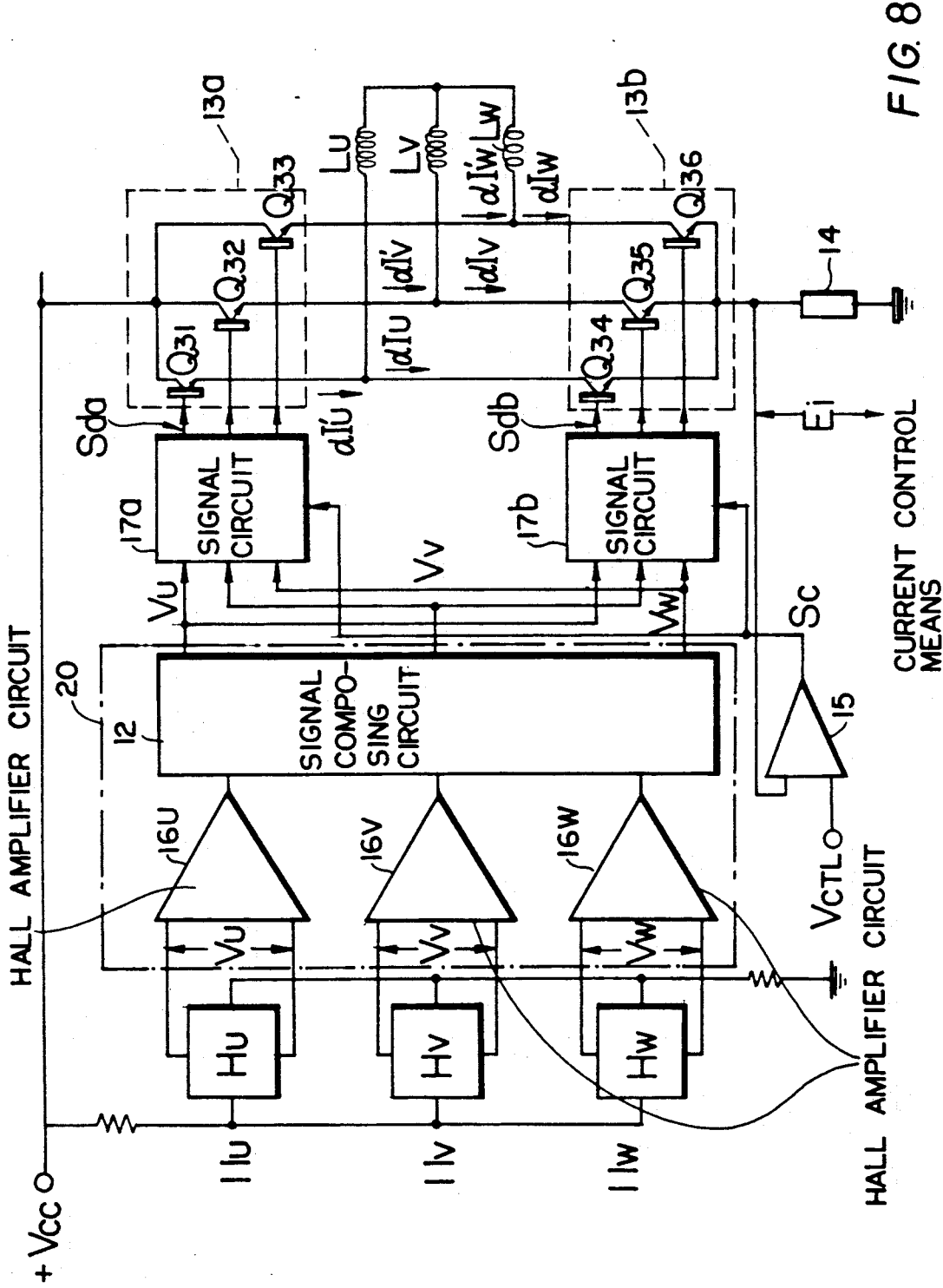
FIG. 8 is a block diagram of a conventional drive circuit.

FIG. 7 shows a graphic illustration of some of the characteristics of an alternative embodiment of the invention, where the horizontal coordinate represents the level of the fifth harmonics n [%] and the vertical coordinate represents the level of torque ripples expressed in %.

There has been proposed a brushless motor drive circuit comprising drive coils Lu, Lv and Lw which are utilized for generating a counter electromotive voltage Ea that contains fifth harmonics (n/100) sin5θ in order to improve the level of torque ripples. Then, the counter electromotive voltage Ea is expressed by the equation below.

$$Ea = \sin\theta + (n/100)\sin 5\theta \qquad (13)$$

The effect of reducing the level of torque ripples of a drive circuit is enhanced by causing the counter electromotive voltage Ea to contain fifth harmonics. This will be understood by referring to FIG. 7. FIG. 7 shows the condition of torque ripples, where the content of fifth harmonics n (%) is varied. As seen from graph A, the level of torque ripples is lowered as the content of fifth harmonics n% is increased.

If the above feature is added to a brushless motor drive circuit according to the invention, the lowest level of torque ripples can be less than 1%. Besides, the effect of distortion of the fifth harmonics on the waveform of the counter electromotive voltage Ea can be minimized.

As described above, since the second embodiment of the invention can reduce the level of torque level even further and minimize the effect of distortion of the fifth harmonics on the waveform of the counter electromotive voltage Ea, any undesirable magnetization of the magnets of the rotor is avoided to enhance the overall efficiency of the motor. Such a feature is particularly advantageous for a motor of peripherally opposed multipolar type that scarcely has any room for additional magnetization.

Figure 3A:
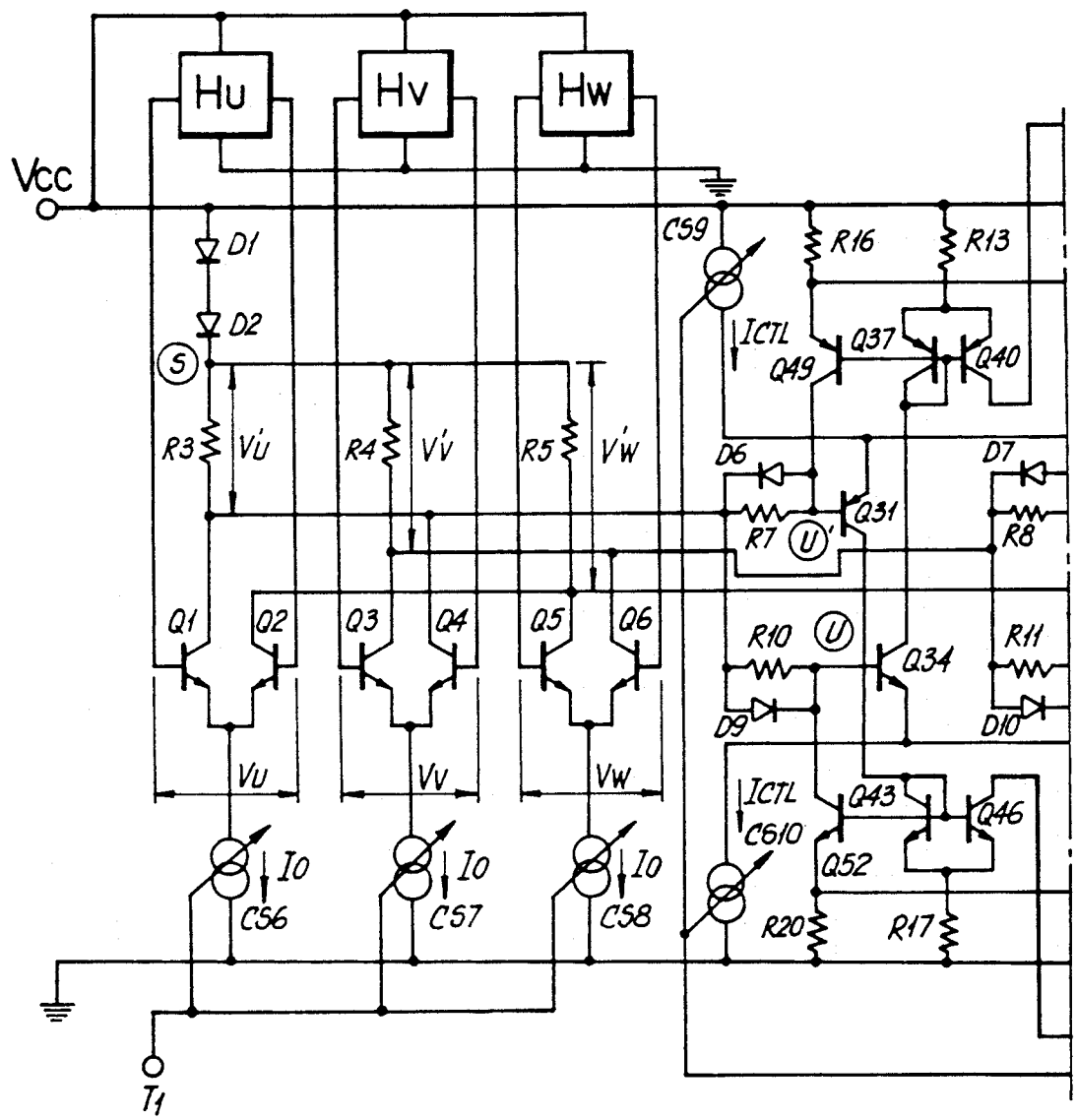
FIGS. 3A and 3B are a circuit diagram of the second embodiment of the present invention.
Figure 3B:
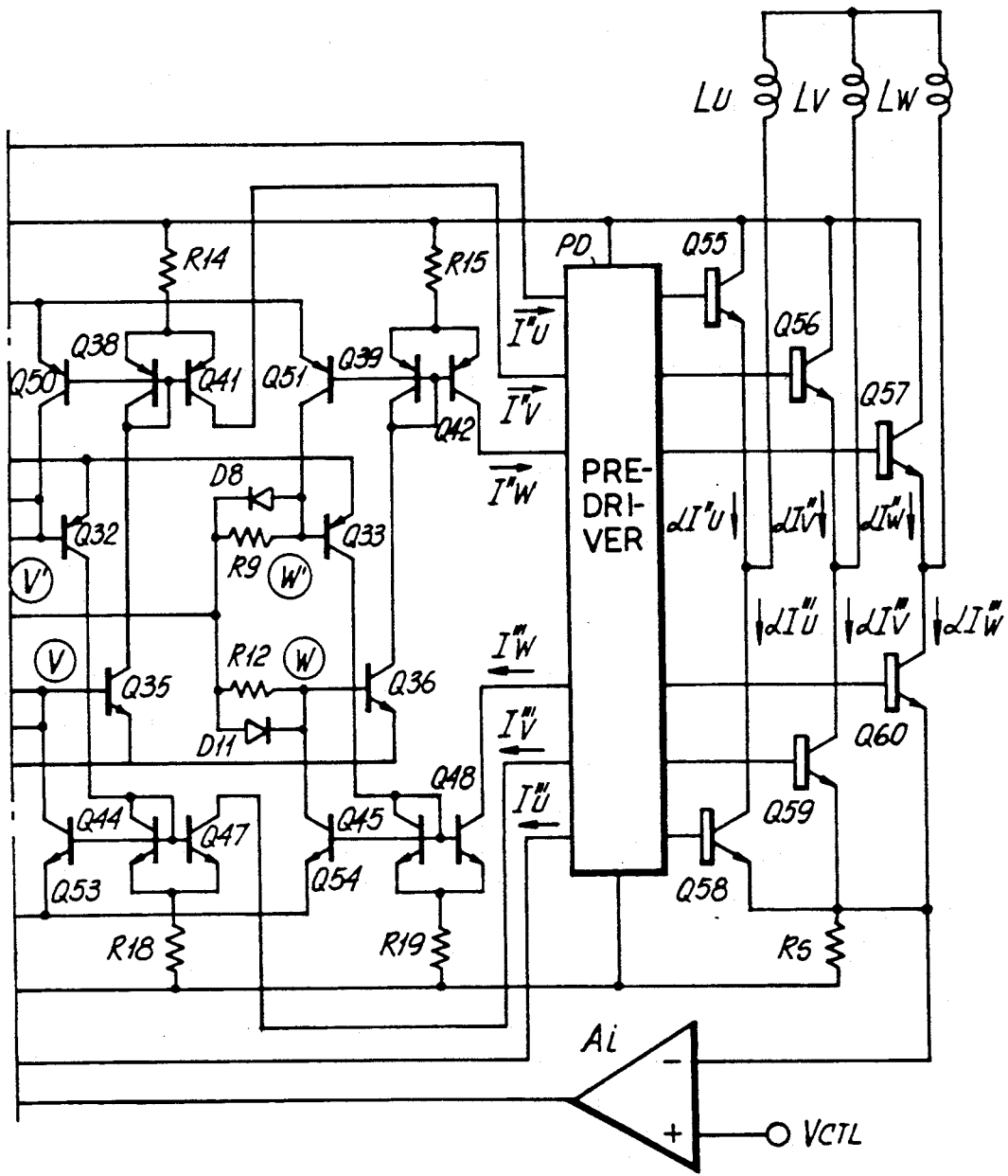
Figure 4:
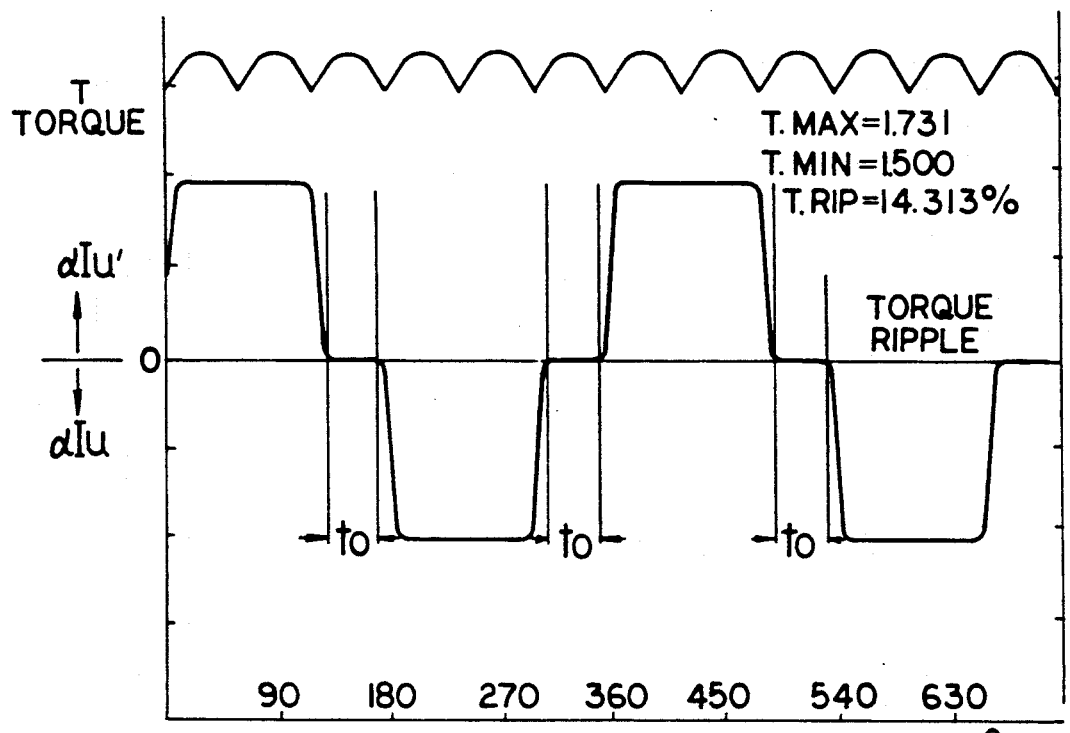
FIG. 4 illustrates a graphic representation of the waveform of signals of a prior art arrangement.

FIG. 3 shows a circuit diagram of another preferred embodiment of the invention.

Variable current sources CS6 through CS8 are used in place of current sources CS1 through CS3 for a Hall amplifier circuit and a signal composing circuit 44. Each of these current sources CS6 through CS8 can generate electric current $I_0$ in response to an input voltage applied by regulating terminal $T_1$ and regulate the electric current $I_0$ of the variable current sources CS6 through CS8 by arbitrarily setting the level of the current and modifying the voltage applied by the regulating terminal $T_1$.

Soft switching signals Vu', Vv' and Vw' from the Hall amplifying circuit and signal composing circuit 44 are sent by way of respective sets of resistors R7 through R12 to a 3-differential amplifier comprising PNP-type transistors $Q_{31}$ through $Q_{33}$, NPN-type transistors $Q_{34}$ through $Q_{36}$ and variable current sources CS9 and CS10, where they are converted into electric currents and then amplified. Output currents Iu'', Iv'', Iw'', Iu''', Iv''' and Iw''' of the 3-differential amplifier are then supplied to a predriver PD by way of a mirror circuit comprising transistors $Q_{37}$ through $Q_{42}$ as well as $Q_{43}$ through $Q_{48}$. Besides, in phase U for instance, the soft switching signal Vu' from the Hall amplifying circuit and signal composing circuit 44 is supplied by way of resistors R7 and R10 to the transistors $Q_{31}$ and $Q_{34}$, where it is converted into a current and amplified, while the output current form the collector of the transistor $Q_{31}$ is fed back of the base (point U) of the transistor by a mirror circuit comprising transistors $Q_{43}$ and $Q_{52}$ and resistors R17 and R20. Moreover, the collector current of the transistor $Q_{34}$ is fed back to the base (point U') of the transistor $Q_{31}$ by a mirror circuit comprising transistors $Q_{37}$ and $Q_{49}$ and resistors R13 and R16. It should be noted that the feedback current supplied to the bases of the transistors $Q_{34}$ and $Q_{31}$ are at a level significantly lower than that of the current $I_0$ coming from the variable current sources CS6 through CS8.

In phases V and W too, the soft switching signals Vv' and Vw' from the Hall amplifying circuit and signal composing circuit 44 are supplied by way of respective resistors R8 and R11 and R9 and R12 to the respective transistors $Q_{32}$ and $Q_{35}$ and $Q_{33}$ and $Q_{36}$, where it is converted into a current and amplified, while the output current from the collector of the transistor $Q_{31}$ are fed back to the respective bases (point V and W) of the transistors $Q_{35}$ and $Q_{36}$ by respective mirror circuits comprising respectively transistors $Q_{44}$ and $Q_{53}$ and $Q_{45}$ and $Q_{54}$ and resistors R18 and R21 and R19 and R21.

Moreover, the collector currents of the transistors $Q_{34}$ and $Q_{35}$ are respectively fed back to the bases (points V' and W') of the transistors $Q_{32}$ and $Q_{33}$ by respective mirror circuits comprising transistors $Q_{38}$ and $Q_{50}$ and $Q_{39}$ and $Q_{51}$ and resistors R14 and R15 and R17. It should be also noted that the feedback currents supplied to the bases of the respective transistors $Q_{32}$ and $Q_{33}$ and $Q_{35}$ and $Q_{36}$ are at a level significantly lower than that of the current $I_0$ coming from the variable current sources CS6 through CS8.

Figures 12A, 12B:
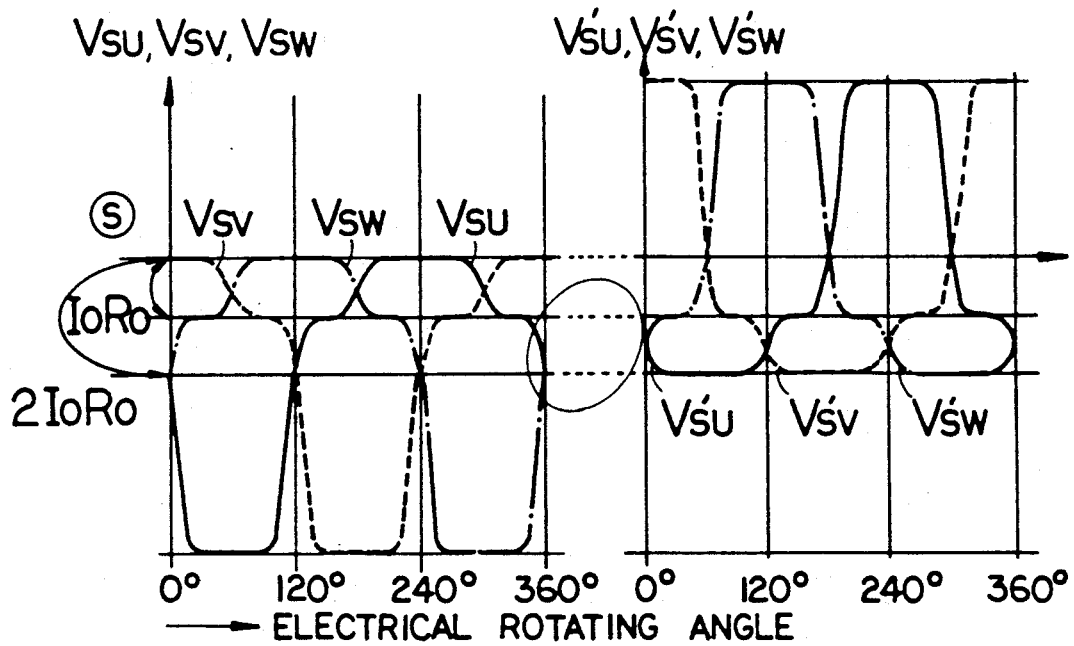

Thus, voltages Vsu, Vsv and Vsw between cathode S of diode D2 and the respective points U, V and W as well as voltages Vsu', Vsv' and Vsw' between the cathode S of the diode D2 and said respective points U', V' and W7 are as shown in FIG. 12. Diodes D6, D9, D7, D10, D8 and D11 function to limit the amplitude of the respective Vsu, Vsv, Vsw, Vsu', Vsv' and Vsw'.

A group of transistors comprising transistors $Q_{55}$, $Q_{56}$ and $Q_{57}$ introduce source currents αIu'', αIv'' and αIw'' respectively into 3-phase drive coils Lu, Lv and Lw in response to an output signal from the predriver PD, whereas another group of transistors comprising transistors $Q_{58}$, $Q_{59}$ and $Q_{60}$ lead sink currents αIu''', αIv''' and αIw''' respectively out of the 3-phase drive coils Lu, Lv and Lw in response to an output signal from the predriver PD. The source currents αIu'', αIv'' and αIw'' are obtained by multiplying respectively the input currents Iu'', Iv'' and Iw'' of the predriver PD by o by means of the predriver PD and the transistors $Q_{55}$, $Q_{56}$ and $Q_{57}$, whereas the sink currents αIu''', αIv''' and αIw''' are obtained by multiplying respectively the input currents Iu''', Iv''' and Iw''' of the predriver PD by a by means of the predriver PD and the transistors $Q_{58}$, $Q_{59}$ and $Q_{60}$.

Current detecting resistor Rs detects the currents flowing respectively through the drive coils Lu, Lv and Lw and converts them into corresponding voltages, which are then compared with motor speed control signal $V_{CTL}$ at current feedback amplifier Ai to control current $I_{CTL}$ of the variable current sources CS9 and CS10 by modifying the output levels of the variable current sources CS9 and CS10 whenever error voltages are detected. So long as the motor speed control signal $V_{CTL}$ is maintained at a constant value, the current $I_{CTL}$ is controlled so that the level of the current flowing through the current detecting resistor Rs as well as that of the currents supplied to the drive coils Lu, Lv and Lw are kept constant.

Figure 9:
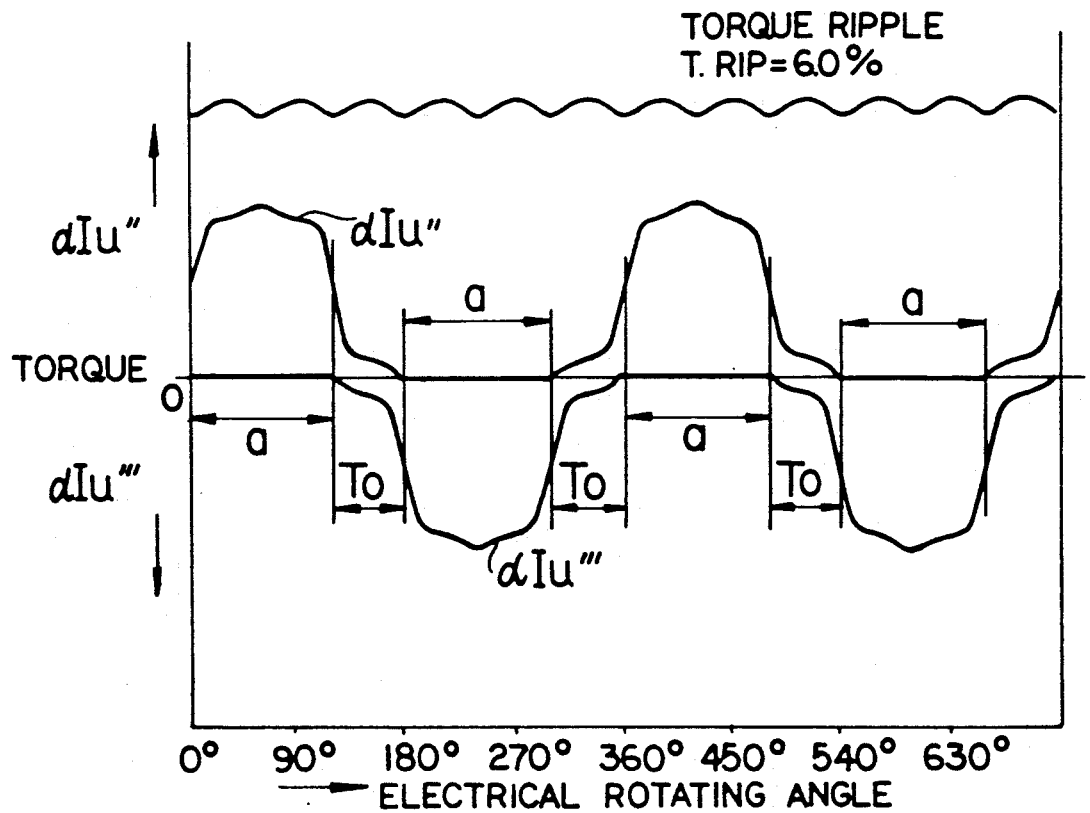
FIG. 9 is a graphic illustration showing the waveform of the drive coil current and that of the composite torque of the second embodiment.

FIG. 9 shows the source current αIu'' and the sink current αIu''' of the drive coil Lu for phase U obtained by means of a simulation technique. As seen from the graph, both the source current αIu'' and the sink current αIu''' flow as reactive currents in non-current supply period $T_0$ during which the current to the drive coil Lu for phase U has to be blocked since the transistors $Q_{55}$ and $Q_{58}$ a for phase U are turned on, whereas they do not appear in current supply sections a in which electric currents have to flow to feed the drive coil Lu. The above statement also holds true for phases V and W. The level of torque ripples obtained by simulation on the basis of the drive currents of drive coils Lu, Lv and Lw is approximately 6.0%, which represents an improvement of about 38% as compared with the level of approximately 9.7% in the case of FIG. 5. The composite torque is also improved as compared with that of FIG. 5.

Figure 10:
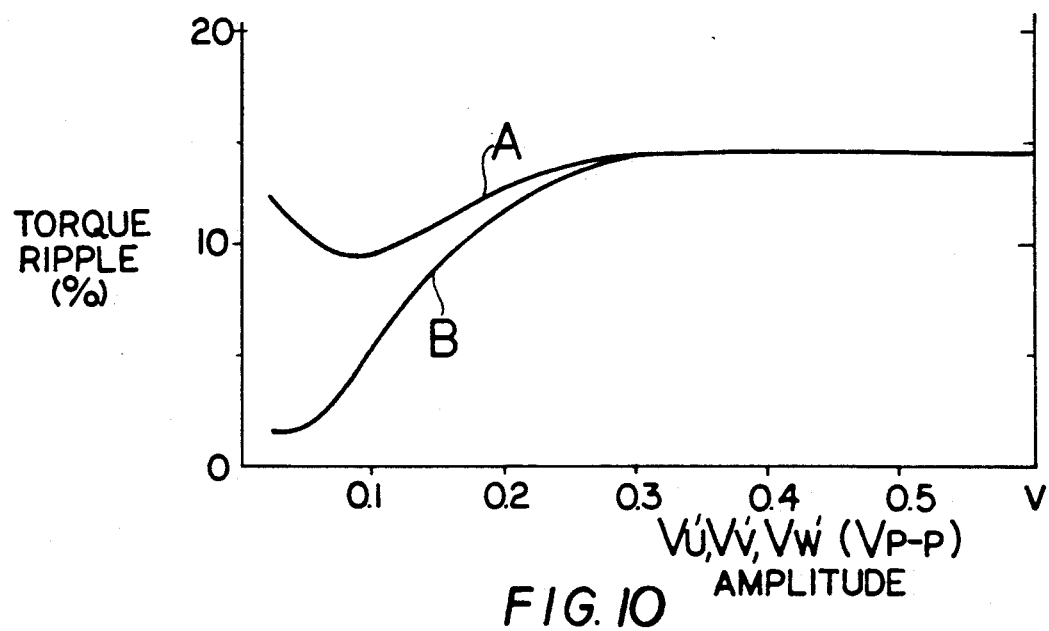
FIGS. 10 and 11 are graphic representations of the waveforms of signals of the second embodiment and its characteristics.

The characteristic curve B of FIG. 10 is obtained by plotting the torque ripples of the above embodiment produced in a simulation where the amplitudes of the soft switching signals Vu', Vv' and Vw' are varied from 20 m volts p—p to 600 m volts p—p. This represents a major improvement as compared with that of the first embodiment drive circuit illustrated in FIG. 1.

Figure 11:
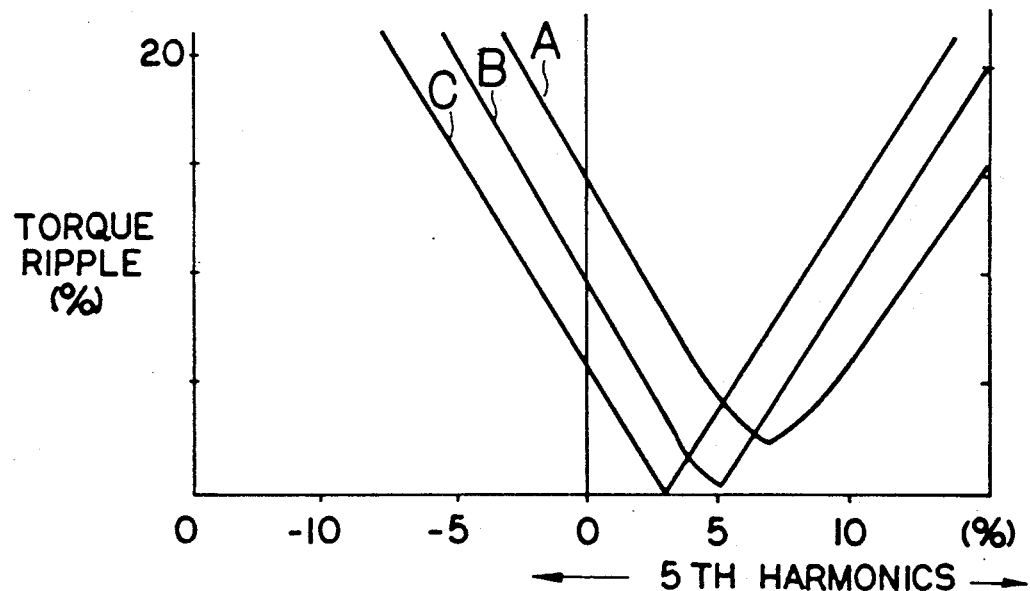

FIG. 11 shows the level of torque ripples when the fifth harmonics contained in the counter electromotive voltage of the drive coils is varied between −15% and +15% for a conventional drive circuit (characteristic curve A), for the first embodiment of drive circuit of FIG. 1 (characteristic curve B) and for the second embodiment of FIG. 3 (characteristic curve C). As is apparent from the curves, the embodiment can minimize the level of torque ripples for the fifth harmonics.

The counter electromotive voltage of the drive coils can be caused to contain fifth harmonics by superposing fifth harmonics to it by means of heteropolar magnetization of non-magnetization of the drive magnets of the coils.

In the above described embodiment, simultaneous ON-sections that become ON simultaneously are generated for those of the transistors $Q_{55}$, $Q_{56}$, $Q_{57}$, $Q_{58}$, $Q_{59}$ and $Q_{60}$ having the same phase to cause reactive currents to flow through the simultaneous ON-sections as illustrated in FIGS. 5 and 9, when the current $I_0$ of the variable current sources CS6 through CS8 is set to a small value. The simultaneous ON-section generating means for generating simultaneous ON-sections comprises variable current sources CS6 through CS8, transistors $Q_1$ through $Q_6$ for a Hall amplifying circuit, resistors R3 through R5 and transistors $Q_{31}$ through $Q_{33}$ and $Q_{34}$ through $Q_{36}$ for a 3-differential amplifier. As seen from FIG. 9, no reactive current appears at all in current supply sections a. The reactive current braking means for preventing any reactive currents from passing through the current supply sections a comprises resistors R7 through R12, diodes D6 through D11, transistors $Q_{49}$ through $Q_{54}$, resistors R20 and R16. The current control means for controlling the electric currents running respectively through the 3-phase drive coils Lu, Lv, Lw comprises a current detecting resistor, a current feedback amplifier Ai and variable current sources CS9 and C10.

The currents for simultaneously turning on the transistors with the same phase in sections a in FIG. 5 have a level inversely proportional to the amplitude of the soft switching signals Vu', Vv' and Vw' and are reactive currents that do not participate in driving the motor. These reactive currents hinder the effect of correcting torque ripples and even worsen them if the currents are not even across the phases. The above described embodiment produces the following effects by annihilating any reactive currents than can appear in said sections a. Firstly, since no reactive currents flow through sections a even if the amplitude of the soft switching signals Vu', Vv' and Vw' is reduced, the level of torque ripples can be improved significantly by reducing the amplitude of the soft switching signals Vu', Vv' and Vw'. Secondly, as a result of reduction of the amplitude of the soft switching signals Vu', Vv' and Vw', the motor noise level can be also reduced. Thirdly, the level of torque ripples can hardly be aggravated even if the components are not unified in terms of quality. Then, the effect of correcting torque ripples is significantly improved as seen in FIG. 10. Finally, the rotor magnets are free from undesirable corrective magnetization because the level of torque ripples can be reduced even if they scarcely contain fifth harmonics.

The resistors R13 through R20 may be omitted in the above described embodiment.

Figure 13A:
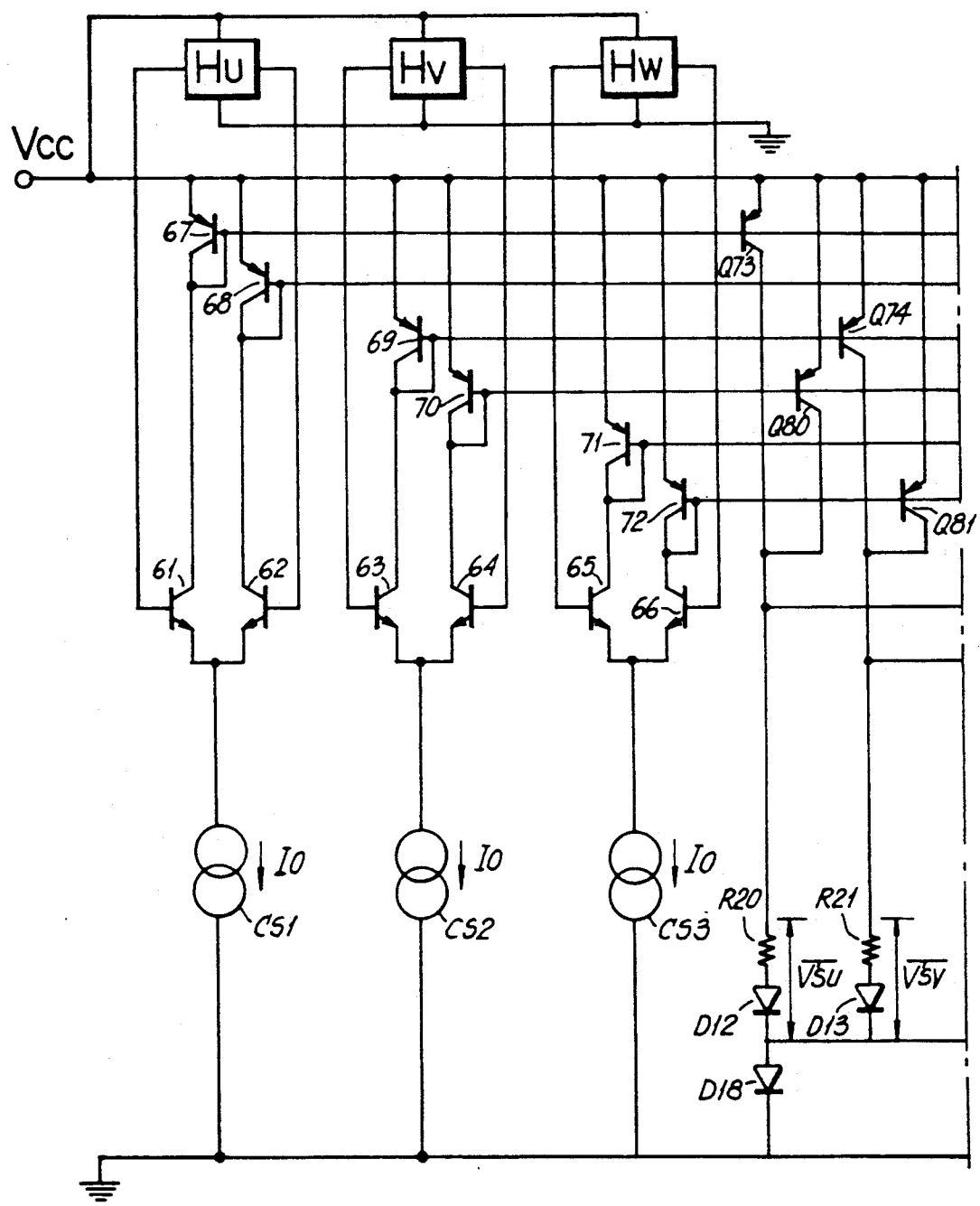
FIGS. 13A and 13B and 14A and 14B are other arrangements of the second embodiment.
Figure 13B:
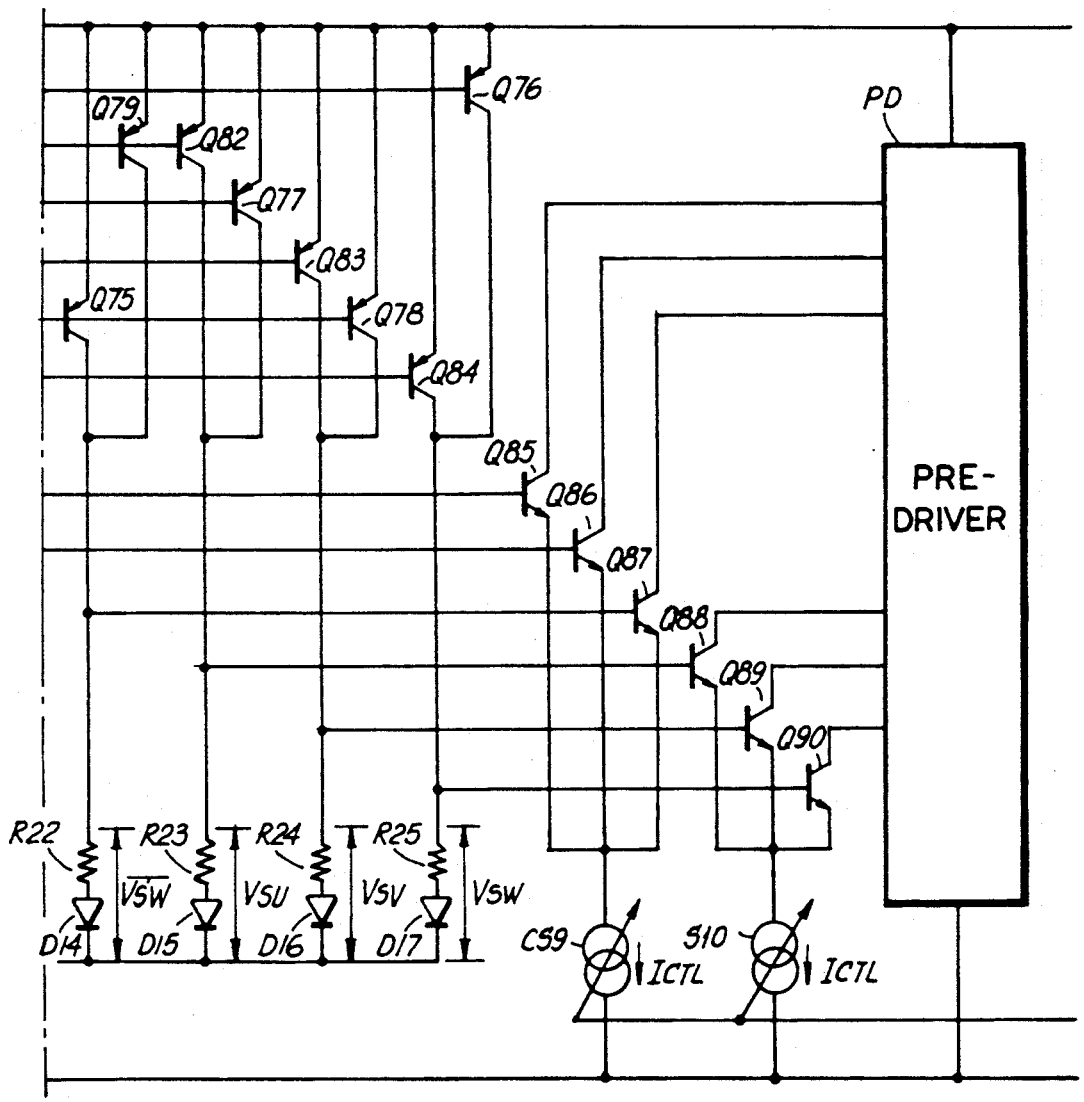

FIG. 13 shows a part of an alternative arrangement of this embodiment of the invention.

In this embodiment, Hall devices Hu, Hv and Hw are supplied with electric currents from a power source and detect the angular position of the rotor comprising the bipolarly magnetized rotor magnets to transmit from the output terminals of the rotor and the stator of the motor 3-phase output signals in the form of sine waves having phases shifted by 120° from one another in accordance with the mutual positional relationship between the rotor and the stator having 3-phase drive coils Lu, Lv and Lw.

The Hall amplifying circuit and signal composing circuit of the embodiment comprise transistors $Q_{61}$ through $Q_{84}$ and current sources CS1 through CS3. The Hall amplifying circuit and signal composing circuit transform the output signals of the Hall devices Hu, Hv and Hw into rectangular pulse signals by flattening the inflection points of the waveform original signals by means of logarithmic compression and at the same time form 3-phase soft switching by compounding them.

Resistors R20 through R25 and diodes D12 through D18 constitute a current/voltage converter, which convert the output signals of said Hall amplifying circuit and signal composing circuit into signals $\overline{Vsu'}$, $\overline{Vsv'}$, $\overline{Vsw'}$, Vsu, Vsv and Vsw as illustrated in FIG. 12. The signals $\overline{Vvs'}$, $\overline{Vsv'}$ and $\overline{Vsw'}$ have waveforms respectively obtained by inverting the waveforms of Vsu', Vsv' and Vsw' illustrated in FIG. 12. These signals are then converted respectively into electric currents Iu'', Iv'', Iw''', Iu''', Iv''' and Iw'''' by a voltage/current converter comprising transistors $Q_{85}$ through $Q_{90}$ and variable current sources CS9 and CS10 and transmitted to predriver PD so that the variable current sources CS9 and CS10 can be controlled by the output signal of current feedback amplifier Ai to modify their current level $I_{CTL}$. The operation of the portion of the drive circuit downstream to the predriver PD is identical with that of the first embodiment.

Figure 14A:
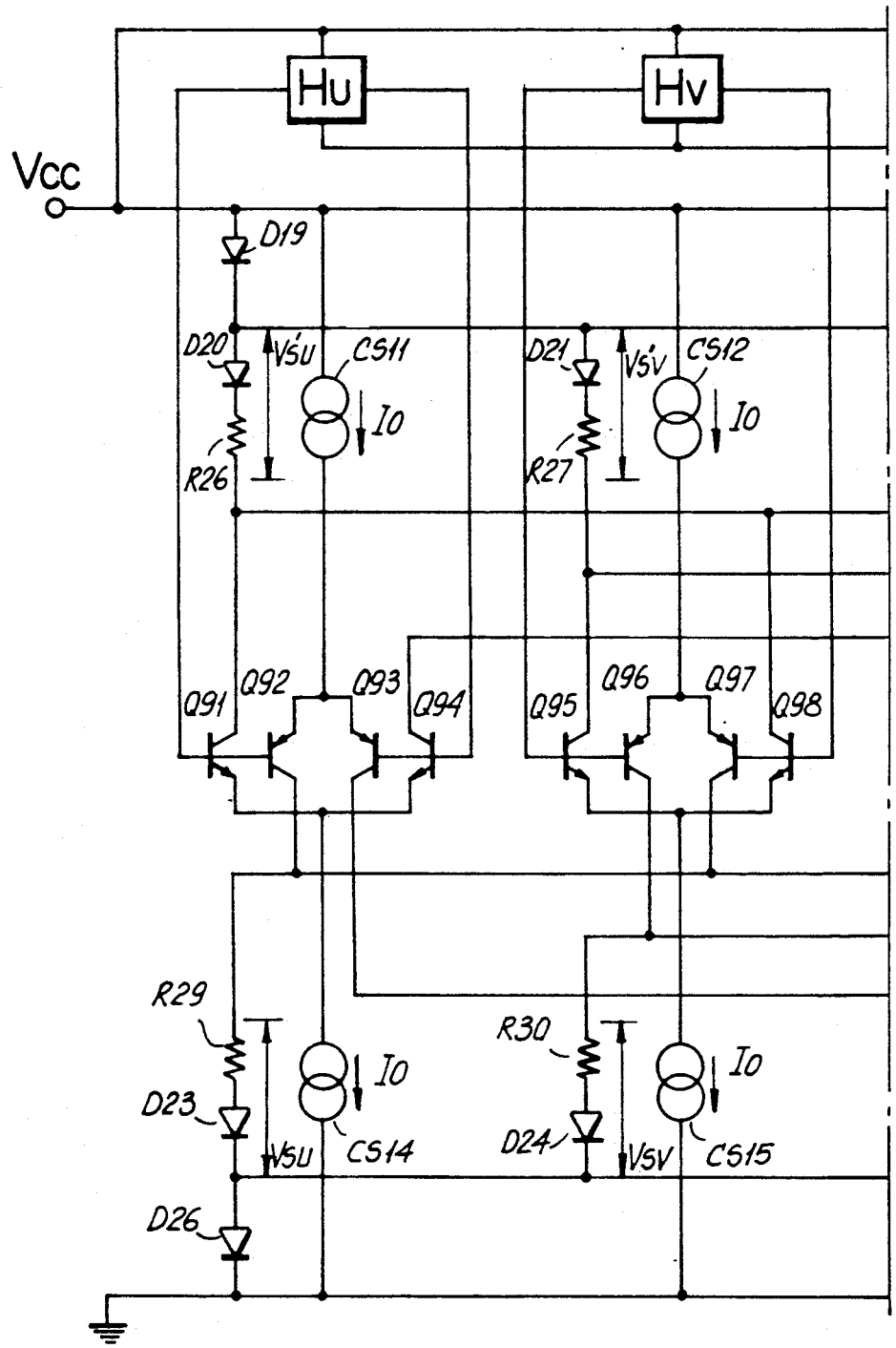
Figure 14B:
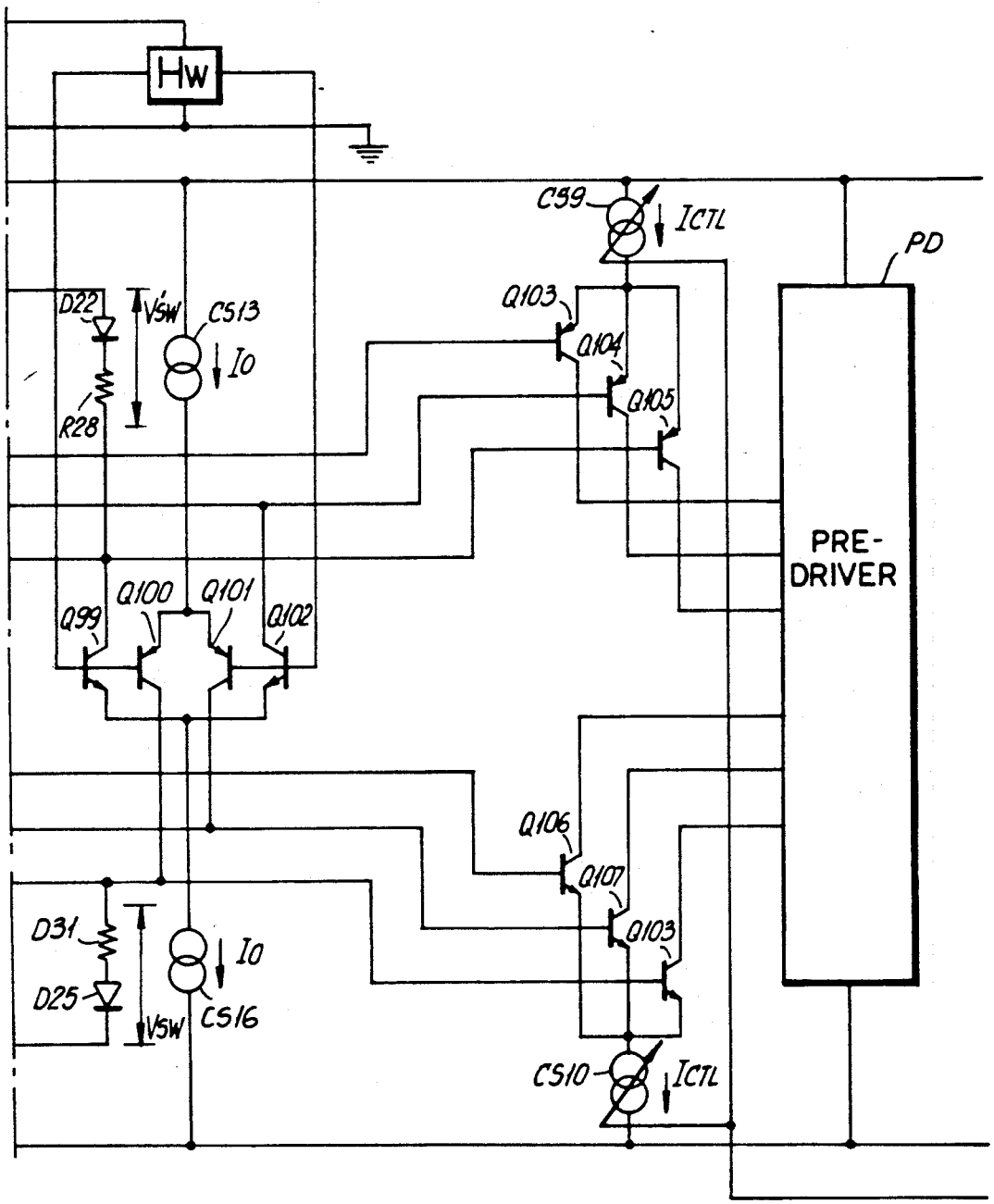

FIG. 14 illustrates another alternative embodiment of the invention.

In this embodiment, transistors $Q_{91}$ through $Q_{102}$, current sources CS11 through CS16, resistors R26 through R31 and diodes D19 through D26 constitute a Hall amplifying circuit and signal composing circuit and a current/voltage converter, which amplify the output signals of Hall devices Hu, Hv and Hw and transform them into rectangular pulse signals by flattening the inflection points of the waveform original signals by means of logarithmic compression. At the same time, they form 3-phase soft switching signals by compounding them and converting the soft switching signals to voltage signals Vsu', Vsv', Vsw', Vsu, Vsv and Vsw as illustrated in FIG. 12. The signals are then converted respectively into currents Iu'', Iv'', Iw'', Iu''', Iv''' and Iw''' by a current/voltage converter comprising variable current sources CS9 and CS10 and the currents are supplied to a predriver PD so that the variable current sources CS9 and CS10 can be controlled by the output signal of current feedback amplifier Ai to modify their current level $I_{CTL}$. The operation of the portion of the drive circuit downstream to the predriver PD is identical with that of the previous embodiment.

In accordance with the above description, many advantages and benefits are provided by the present invention.

Firstly, since a brushless motor drive circuit according to the invention has been designed so that the peaks of the composite torque are suppressed through reduction of the level of torque ripples due to reactive currents which are supplied to a current detecting means simply by modifying the output of a signal composing circuit, the level of torque ripples can be significantly reduced without requiring any additional circuitry that can increase the overall dimensions of the circuit.

Secondly, since signals for modifying the level of torque ripples are not formed by utilizing detection signals from an angular position detecting means, the accuracy of the angular position detecting means is not affected by the torque ripple reduction feature.

Thirdly, the feature of simultaneously closing both the positive and negative groups of switching devices at a timing at which a portion of the circuit is opened for a given period of time ensures reactive currents to flow smoothly.

Finally, the feature of causing reactive currents to flow through the current detecting means of a brushless motor according to the invention which is designed so as to generate a counter electromotive voltage that contains fifth harmonics by closing both the positive and negative groups of switching devices with a given section by means of modification of the output of a signal composing circuit significantly reduces the level of torque ripples.

While the foregoing description and drawings represent the preferred embodiments of the present invention, it will be obvious to those skilled in the art that various changes and modifications may be made therein without departing from the true spirit and scope of the present invention.

What is claimed is:

1. A brushless motor drive circuit comprising:
   a stator having m-phase drive coils;
   a rotor hving a number of magnetic poles;
   a plurality of angular position detecting means for providing output signals in the form of m-phase sine waves representing the positional relationship between said stator and said rotor;
   signal processing means for transforming the output signal from each position detecting means into a rectangular wave pulse signal by flattening the inflection points of the sine wave by logarithmic compression so as to compose m-phase soft switching signals;
   a group of switching devices arranged in positive and negative sides for switching the current supplied to said m-phase drive coils in response to the output signa from said signal processing means;
   current control means for controlling the level of the current supplied to said m-phase drive coils by means of said positive and negative sides switching devices;
   current detecting means arranged to detect the level of the current flowing through said drive coils and for applying the detecting current level to said current controls means; and
   means for causing reactive current to be supplied to said current detecting means for reduction of torque ripple by simultaneously causing the positive and negative sides switching devices to be capable of being supplied with current at a timing at which no current is supplied to each of the m-phases.

2. A brushless motor drive circuit according to claim 1, wherein, by operation of said device, fifth harmonics of counter electromotive voltage are superposed onto the waveform of counter electromotive voltages generated in the drive coils.

3. A brushless motor drive circuit comprising:
   a stator having an m-phase drive coil;
   a rotor for being rotationally driven by said stator;
   position detecting means for providing an output signal in the form of an m-phase sine wave representing the positional relationship between said rotor and said stator;
   a signal composing circuit for transforming said output signal into a recrangular pulse signal by flattening the inflection points of tne sine wave by means of logarithmic compression;
   a plurality of switching elements for switching the electric current supplied to said m-phase drive coil in response to the output signal of the signal composing circuit, said switching elements having an ON and OFF condition;
   current control means for controlling the rate of the current supplied to ,said m-phase drive coil by said plurality of switching elements;
   resistive means for detecting electric current flowing through said drive coil and for providing a negative feedback signal to said current control means; and
   simultaneous ON-section generating means for simultaneously causing those switching elements having the same phase to be in an ON condition in order to supply said resistive means with reactive current during the periods of current supply when no current is to be supplied to said m-phase drive coil.

4. A brushless motor drive circuit according to claim 3 including reactive current braking means for braking reactive current during the periods of electric current supply when current is to be supplied to said m-phase drive coil.

5. A brushless motor drive circuit according to claim 3, wherein the fifth harmonics of counter electromotive voltage are superposed on the counter electromotive voltage generated within said drive coil.

6. A brushless motor drive circuit according to claim 3 wherein, said switching elements are transistors.

7. A brushless motor drive circuit according to claim 3 also including voltage amplitude determining means for causing the ON section to control the output voltage amplitude of said signal composing circuit.

8. A brushless motor drive circuit as in claim 7 wherein said voltage amplitude determining means operates to set the voltage amplitude of said signal composing circuit between 50 m volts p—p and 250 m volts p—p.

* * * * *